US009559857B2

(12) United States Patent
Von Boehn et al.

(10) Patent No.: US 9,559,857 B2
(45) Date of Patent: *Jan. 31, 2017

(54) PREPROCESSING UNIT FOR NETWORK DATA

(71) Applicant: INTERNATIONAL BUSINESS MACHINES CORPORATION, Armonk, NY (US)

(72) Inventors: Gunnar Von Boehn, Neckar (DE); Reiner Rieke, Althengstett (DE); Joerg-Stephan Vogt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,494

(22) Filed: Jun. 23, 2014

(65) Prior Publication Data

US 2014/0301393 A1 Oct. 9, 2014

Related U.S. Application Data

(63) Continuation of application No. 14/161,215, filed on Jan. 22, 2014, now Pat. No. 9,391,791.

(30) Foreign Application Priority Data

Jan. 22, 2013 (GB) .................................. 1301063.2

(51) Int. Cl.
*H04L 12/02* (2006.01)
*H04L 12/18* (2006.01)
(Continued)

(52) U.S. Cl.
CPC ........... *H04L 12/1877* (2013.01); *H04L 49/90* (2013.01); *H04L 69/22* (2013.01); *H04L 1/06* (2013.01); *H04L 1/08* (2013.01)

(58) Field of Classification Search
None
See application file for complete search history.

(56) References Cited

U.S. PATENT DOCUMENTS 7,106,730 B1 9/2006 Bass et al.
7,284,070 B2 10/2007 Boucher et al.
(Continued)

OTHER PUBLICATIONS

Kim et al. "Offloading Socket Processing for Ubiquitous Services"; Journal of Information Science and Engineering 27, 19-33 (2011) URL: http://www.iis.sinica.edu.tw/page/jise/2011/201101_02.pdf.

*Primary Examiner* — Alex Skripnikov
(74) *Attorney, Agent, or Firm* — Brian F. Russell; Steven L. Bennett

(57) ABSTRACT

A preprocessing unit includes a data receiver to receive a data packet containing packet information, application data, and application data information, a relevance checker to determine relevance of the data packet in dependence on the packet information, an output module to output preprocessor output data, and a first controller to control output of preprocessor output data in dependence on the relevance of the data packet. In order to discard redundant data, thereby reducing the load of the memory, bus, and CPU of the computer system, the preprocessing unit further comprises a redundancy checker to determine redundancy of the application data preferably and a second controller to control output of preprocessor output data in dependence on the redundancy of the application data.

8 Claims, 6 Drawing Sheets

(51) Int. Cl.
  *H04L 29/06*   (2006.01)
  *H04L 12/861*  (2013.01)
  *H04L 1/06*    (2006.01)
  *H04L 1/08*    (2006.01)

(56) References Cited

U.S. PATENT DOCUMENTS

| | | |
|---|---|---|
| 8,069,102 B2 | 11/2011 | Indeck et al. |
| 8,130,758 B2 | 3/2012 | Cohen |
| 8,131,880 B2 | 3/2012 | Boucher et al. |
| 8,218,555 B2 | 7/2012 | Minami et al. |
| 2007/0255866 A1 | 11/2007 | Aloni et al. |
| 2009/0059928 A1* | 3/2009 | Enomoto ............. H04L 1/1841 370/394 |
| 2010/0241758 A1 | 9/2010 | Oddie et al. |
| 2011/0194854 A1 | 8/2011 | Freire et al. |
| 2012/0089497 A1 | 4/2012 | Taylor et al. |
| 2012/0089694 A1 | 4/2012 | Pandya |
| 2012/0287931 A1 | 11/2012 | Kidambi et al. |

\* cited by examiner

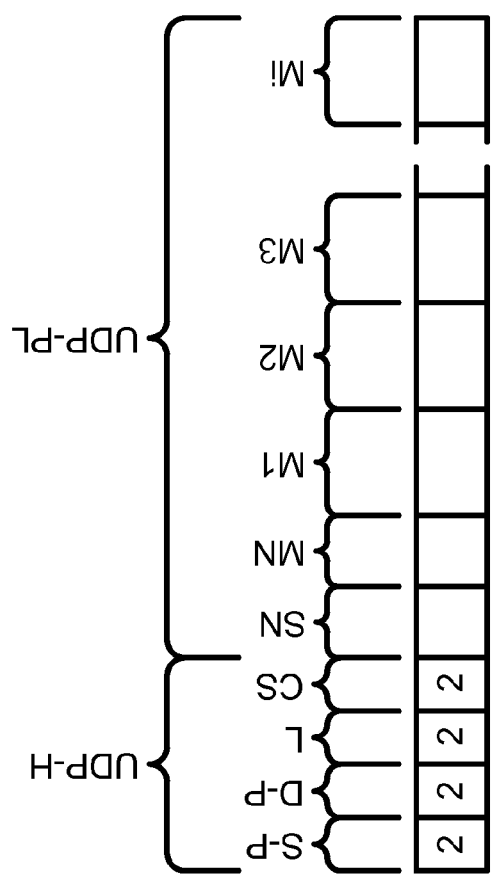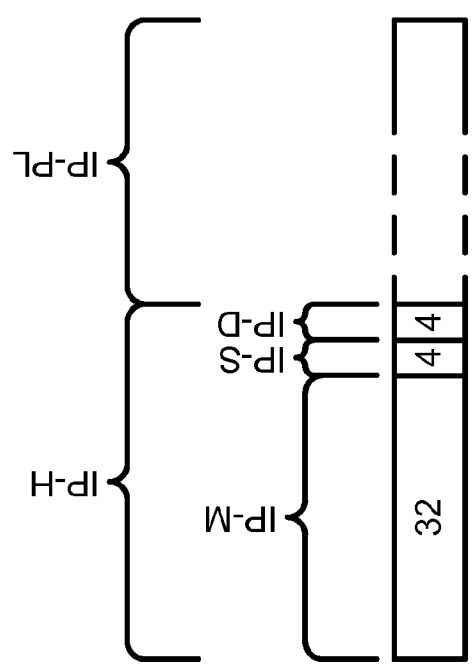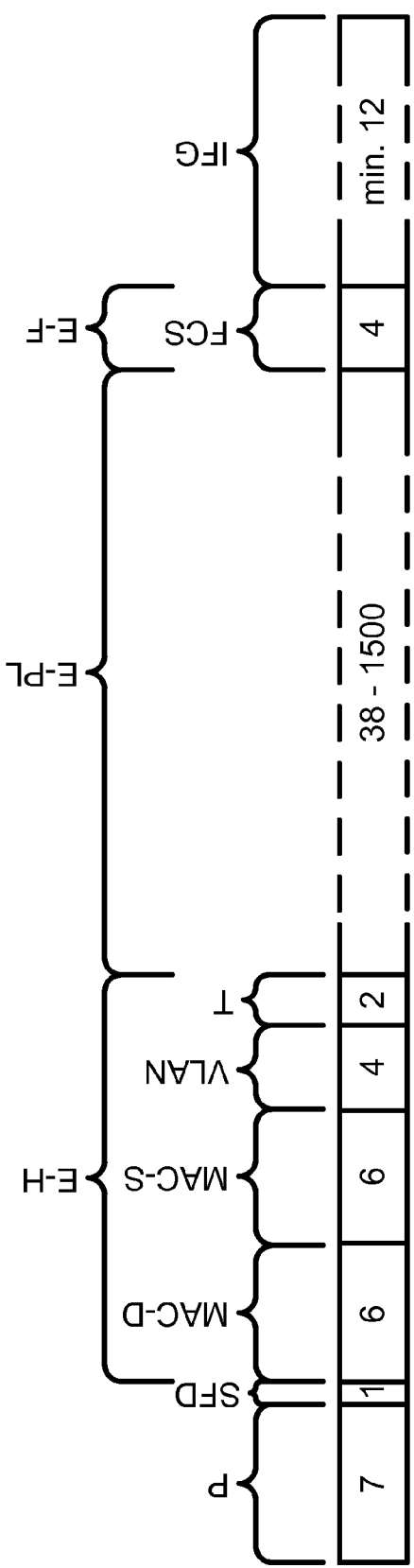

PREPROCESSING UNIT FOR NETWORK DATA

BACKGROUND

The present invention relates to data processing and more particularly to data preprocessing.

In U.S. Pat. No. 8,218,555, U.S. Patent Application Publication No. 2010/0241758, U.S. Pat. No. 8,131,880, U.S. Pat. No. 8,069,102, U.S. Pat. No. 7,284,070, U.S. Patent Application Publication No. 2012/0089497, U.S. Patent Application Publication No. 2007/0255866, U.S. Pat. No. 8,130,758, and U.S. Patent Application Publication No. 2012/0089694, various preprocessing units are disclosed. These preprocessing units preprocess data packets received from sender computers in a network and then transfer application data (i.e., data destined for an application, preferably a software application, running on a receiver computer) contained in the data packets to the receiver computer or other components of the receiver computer if the preprocessing unit is a component of the receiver computer, thereby reducing the load on the receiver computer's memory, bus, and CPU. The transferred application data may be in the original format or a different format after decoding. The preprocessing may include the decoding of multiple network protocols, the stripping of header information, the filtering of data packets in accordance with time predicates or parameters established by a user, performing data reduction operations such as, for example, the calculation of specific prices in the case of application data which is financial data. The preprocessing units may include processors or configurable circuits and may even generate and send a response to the sender computer of a data packet.

U.S. Patent Application Publication No. 2010/0241758 discloses a preprocessing unit including a data receiver to receive a data packet containing packet information and application data, a relevance checker adapted to determine the relevance of said data packet in dependence on said packet information, an output circuit adapted to output preprocessor output data, and a first controller adapted to control the output of preprocessor output data in dependence on the relevance of said data packet. In this context, preprocessor output data are output data of the processor, packet information is data containing information about said data packet, and application data information is data containing information of the application data.

In multicast delivery methods, a single sender computer sends data packets to a group of receiver computers. An advantage of these delivery methods is that they cause relatively low traffic if the data packets comprise application data to be used by several of the receiver computers. Common multicast delivery methods are based on the user datagram protocol (UDP), have no handshaking dialogues (no confirmation is sent from the receiver computers to the sender computer that a data packets has been received), and are therefore prone to data loss. In order to increase the reliability of these and similar delivery methods, identical application data are sent redundantly (at least twice) from one or several sender computers to one or several receiver computers. Disadvantageously, the preprocessing unit disclosed in U.S. Patent Application Publication No. 2010/0241758 is not able to discard redundant application data, resulting in a considerably increased load on the memory, bus, and CPU of the receiver computer.

BRIEF SUMMARY

According to a first aspect of the present invention, a preprocessing unit includes a data receiver to receive a data packet containing packet information and application data, a relevance checker adapted to determine the relevance of the data packet in dependence on the packet information, an output module adapted to output preprocessor output data, and a first controller adapted to control the output of preprocessor output data in dependence on the relevance of the data packet. The preprocessing unit further includes a redundancy checker adapted to determine the redundancy of the application data and a second controller adapted to control the output of preprocessor output data in dependence on the relevance of the data packet. In this context, controlling the output of preprocessor output data in dependence on the relevance means that the control is performed in a way ensuring that the preprocessor output data depend on the relevance. Thus, the control does not necessarily have to take place at the output of the preprocessor, but can take place before (e.g., data of irrelevant data packets may not be forwarded from one processor to the next processor in the data stream). Correspondingly, controlling the output of preprocessor output data in dependence on the redundancy means that the control is performed in a way ensuring that the preprocessor output data depend on the redundancy. The relevance checker, the first controller, the redundancy checker, and the second controller can be formed as a single circuit or module or can be integrated in a single circuit or module. Besides, some of these devices can be formed as a single circuit or module or can be integrated in a single circuit or module, e.g., the first controller and the second controller can form a single controller. Preferably, the preprocessor output data includes the application data, decoded or converted application data, or data based on or dependent on the application data in any way, and can comprise further data, e.g., some or all of the packet information or application data information. Preferably, the preprocessing unit does not output any signal, a signal depending on the application data, or a signal containing decoded or undecoded application data, if the data packet is not relevant and/or if the application data is redundant. In this context, a preprocessing unit is a unit which processes received data packets and outputs preprocessor output data via the output module. The preprocessing unit may be a component of a receiver computer, e.g. a network card plugged in a respective computer slot or an external device connected to a receiver computer and may comprise a processor executing instructions stored in a memory of the preprocessing unit, an ASIC circuit or a configurable circuit as for example a FPGA (field programmable gate array) circuit. Preferably, the data packet is an Ethernet frame, where the Ethernet frame comprises an IP frame as payload, the IP frame comprises a UDP datagram as the payload, and the payload of the UDP datagram comprises the application data and the application data information, and wherein the data packet information is contained in the header of the Ethernet frame, the header of the IP frame, and the header of the UDP datagram. Preferably, the payload of the UDP datagram has a structure specific to the computer system and the preprocessing unit, so that the preprocessing unit can easily distinguish the application data from the application data information. Preferably, the application data information is contained in a header followed by a series of messages, where the series of messages forms the application data, each message contains a message number, and the application data information includes the message number of the first message contained in the UDP datagram and/or the count (total number) of messages contained in the UDP datagram or, alternatively, the message numbers of all messages contained in the UDP datagram. Input/output or I/O devices (including but not limited to keyboards, displays, pointing devices, etc.) can be coupled to the processing unit either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. A particular area of application of the processing unit is in the real-time processing of financial data such as option feeds.

In a preferred embodiment, the preprocessing unit comprises at least one decoder adapted to decode the application data and to generate decoded application data. Preferably, several decoders each adapted to decode the application data and to generate decoded application data are provided. The application data may contain messages with financial data like the prices of shares at a given time in a given format, e.g. ASCI format, which may be decoded (converted) to a different format, e.g., binary format, used by the application(s) running on the receiver computer and easier to process, thereby further reducing the load on the memory, bus, and CPU of the computer system. In addition, only a part of the application data may be decoded or different parts of the application data may be decoded differently.

In a further development of the preferred embodiment, the preprocessing unit comprises an addresser adapted to address said decoded application data to a storage area of a memory. Preferably, the memory is a RAM of a computer. The software application(s) running on the computer presume(s) that specific data is stored in the specified storage area of the memory, speeding up the processing of the application data.

In a preferred embodiment, the preprocessing unit comprises at least one buffer adapted to send a fill level signal to the second controller, and the second controller is adapted to control the sending of the application data to the at least one buffer or the receipt of the application data by the at least one buffer in dependence on the fill level signal. Both alternatives are equivalent. Preferably, several buffers each adapted to send a fill level signal to the second controller are provided and the second controller is adapted to control the sending of the application data to one buffer of the several buffers or the receipt of the application data by one buffer of the several buffers in dependence on the fill level signals. Thus, an overflow of the buffers can be prevented.

In yet another preferred embodiment, the relevance checker is adapted to determine the relevance of the data packet received from a first incoming line in dependence on the packet information, and the preprocessing unit comprises a further relevance checker adapted to determine the relevance of a further data packet received from a second incoming line in dependence on the packet information of the further data packet. Thus, the two relevance checker can check the relevance of data packets from two incoming lines in parallel.

In yet another preferred embodiment, the relevance checker comprises at least one subscription checker adapted to determine whether the data packet originates from a subscribed sender and a delayer adapted to delay the transfer of the application data, while the relevance of the data packet is determined. In order to determine the relevance of a data packet, the subscription checker verifies whether an entry indicating that the data packet is relevant is present in a subscription memory. Preferably, the relevance checker comprises at least two subscription checkers and switches between the at least two subscription checkers, wherein the packet information is alternately sent to one of the subscription checkers. The subscription checkers use a search procedure which takes several clock cycles in order to check whether an entry in the subscription memory already exists. By providing at least two subscription checkers working in parallel, the delay of the processing unit can be minimized.

In yet another preferred embodiment, the data packet contains application data information, the redundancy checker comprises an information memory, and the redundancy checker is adapted to store identification data depending on the application data information in the information memory and to determine the redundancy of the application data in dependence on identification data of data packets received before and stored in the information memory. Preferably, a second data packet comprising the same application data as a first data packet received before also comprises the same application data information as the first data packet, wherein only data packets comprising identical application data also comprise identical application data information. Either the application data of the second data packet or the first data packet is redundant. Usually, the application data of the second data packet is defined as redundant application data. In order to verify whether the application data of the second data packet is redundant, the application data of the first data packet can be compared to the application data of the second data packet, or the application data information of the first data packet can be compared to the application data information of the second data packet. Comparing only the application data requires fewer resources.

In a further development of the last preferred embodiment, the identification data also depends on the packet information. Taking into account at least a part of the packet information, the verification of the redundancy is unambiguous.

In yet another preferred embodiment, the preprocessing unit includes a configurable circuit, and the relevance checker and the redundancy checker are formed by configured elements of the configurable circuit. FPGA circuits are the preferred configurable circuits. As specialized hardware circuits, configurable circuits are very fast. In addition, a preprocessing unit in the form of a configurable circuit can be easily manufactured in small quantities.

In a further development of the preferred embodiment, the preprocessing unit comprises a nonvolatile memory containing the configuration data and a data loader adapted to transfer the configuration data. The configuration data is transferred to configuration memories defining the configuration of the configurable circuit. Preferably, the nonvolatile memory also contains handling data which is transferred to one or several handling memories by the data loader.

According to a second aspect of the present invention, a preprocessing method comprises the following steps:
  receiving a data packet containing packet information and application data;
  determining the relevance of the data packet in dependence on the packet information;
  controlling the output of preprocessor output data in dependence on the relevance of the data packet;
  determining the redundancy of the application data; and
  controlling the output of preprocessor output data in dependence on the redundancy of the application data.

In a preferred embodiment of the preprocessing method, the data packet contains application data information, identification data based on the application data information is stored, and the redundancy of the application data is determined in dependence on the identification data of data packets stored before.

In yet another preferred embodiment of the preprocessing method, the identification data also depends on the packet information.

According to a third aspect of the present invention, a computer system including a preprocessing unit comprising a data reception means to receive a data packet containing packet information and application data, a relevance checker adapted to determine the relevance of the data packet in dependence on the packet information, and an output module adapted to output preprocessor output data, a first controller adapted to control the output of preprocessor output data in dependence on the relevance of the data packet further comprises a redundancy checker adapted to determine the redundancy of the application data and a second controller adapted to control the output of preprocessor output data in dependence on the redundancy of the application data.

According to a fourth aspect of the present invention, a data storage device comprises configuration data for a configurable circuit of a preprocessing unit, wherein the configurable circuit comprises a data reception means to receive a data packet containing packet information and application data, a relevance checker adapted to determine the relevance of the data packet in dependence on the packet information, and an output module adapted to output preprocessor output data, a first controller adapted to control the output of preprocessor output data in dependence on the relevance of the data packet further comprises a redundancy checker adapted to determine the redundancy of the application data, and a second controller adapted to control the output of preprocessor output data in dependence on the redundancy of the application data, when the configurable circuit is configured by the configuration data.

In general, a single processing unit can comprise any combination of features of the preferred embodiments and further developments. Correspondingly, the preprocessing method, computer system, and data storage device can comprise any combination of the respective features.

BRIEF DESCRIPTION OF SEVERAL VIEWS OF THE DRAWINGS

FIG. 1A shows the schematic structure of an Ethernet packet;

FIG. 1B shows the schematic structure of an IP frame;

FIG. 1C shows the schematic structure of an UDP datagram;

DETAILED DESCRIPTION

Figure 3:
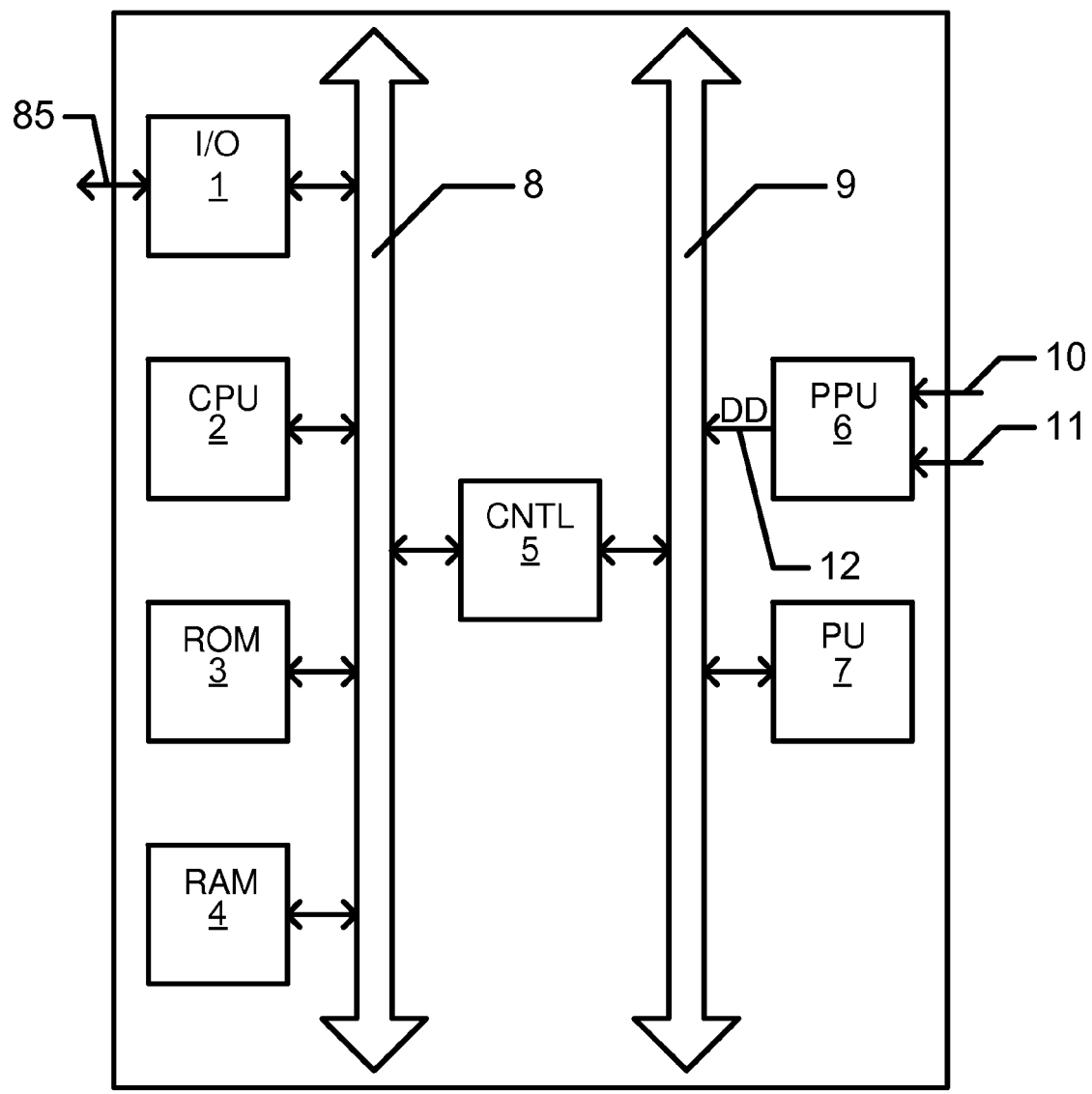
FIG. 3 shows the architecture of a computer comprising a preprocessing unit.

FIG. 1A shows the schematic structure of an Ethernet packet received by a preprocessing unit 6 (see, FIG. 3). The basic structure of the Ethernet packet is standardized. Two consecutive Ethernet data packets are separated by an interframe gap IFG (at least 12 Bytes). Each Ethernet packet includes a preamble P (7 Bytes), a start of frame delimiter SFD (1 Byte), an Ethernet frame (E-H+E-PL), and an Ethernet frame footer E-F (4 Bytes). The Ethernet frame is composed of an Ethernet frame header E-H and an Ethernet frame payload E-PL. The Ethernet frame header E-H comprises a media access destination address MAC-D (6 Bytes), a media access source address MAC-S (6 Bytes), and a VLAN tag (4 Bytes). The Ethernet frame payload has a size between 38 and 1500 Bytes.

FIG. 1B shows the schematic structure of an IP frame. The IP frame (IPv4) forms the payload of the Ethernet frame and comprises an IP frame header IP-H (40 Bytes) and an IP frame payload IP-PL. The IP frame header IP-H comprises a IP destination address IP-D (4 Bytes), a IP source address IP-S (4 Bytes), and several further fields summarized as IP-M (32 Bytes) and not described in more detail as the exact structure is not relevant in the context of the present invention.

FIG. 1C shows the schematic structure of an UDP datagram. The UDP datagram forms the payload of the IP frame and comprises a UDP datagram header UDP-H and a UDP datagram payload UDP-PL. The UDP datagram header UDP-H comprises a source port address S-P (2 Bytes), a destination port address D-P (2 Bytes), a length field L, and a checksum field CS (2 Bytes).

The data in the Ethernet payload can be unambiguously identified by the destination IP address IP-D, the VLAN tag, and the destination port address D-P. The IP destination address IP-D, the VLAN tag, and the destination port address D-P are referred to as packet information hereinafter. The format of the UDP datagram UDP-PL payload is not standardized and is specific for the present application, and comprises a sequence number field SN, a message number field MN, and one or several messages M1, M2, M3, and Mi, wherein each message includes a message number. The sequence number field SN and the message number field MN are referred to as application data information hereinafter. The messages M1, M2, M3, and Mi are referred to as application data hereinafter. The message sequence number field SN specifies the number of the message sequence or the number of the first message of the respective UDP datagram, and the message number MN specifies the count (total number) of messages in the respective UDP datagram. For example, if five messages are contained in a first UDP datagram, the respective sequence number is SN=1, the respective number of messages is MN=5; if three messages are contained in a second UDP datagram subsequent to the first UDP datagram, the respective sequence number is SN=2, the respective number of messages is MN=3. Alternatively, the respective sequence number can be SN=6, and the respective number of messages can be MN=3. Both numerations are unambiguous. Only one of the alternatives can be used if there is no further field in the UDP datagram specifying the alternative used.

Figure 2:
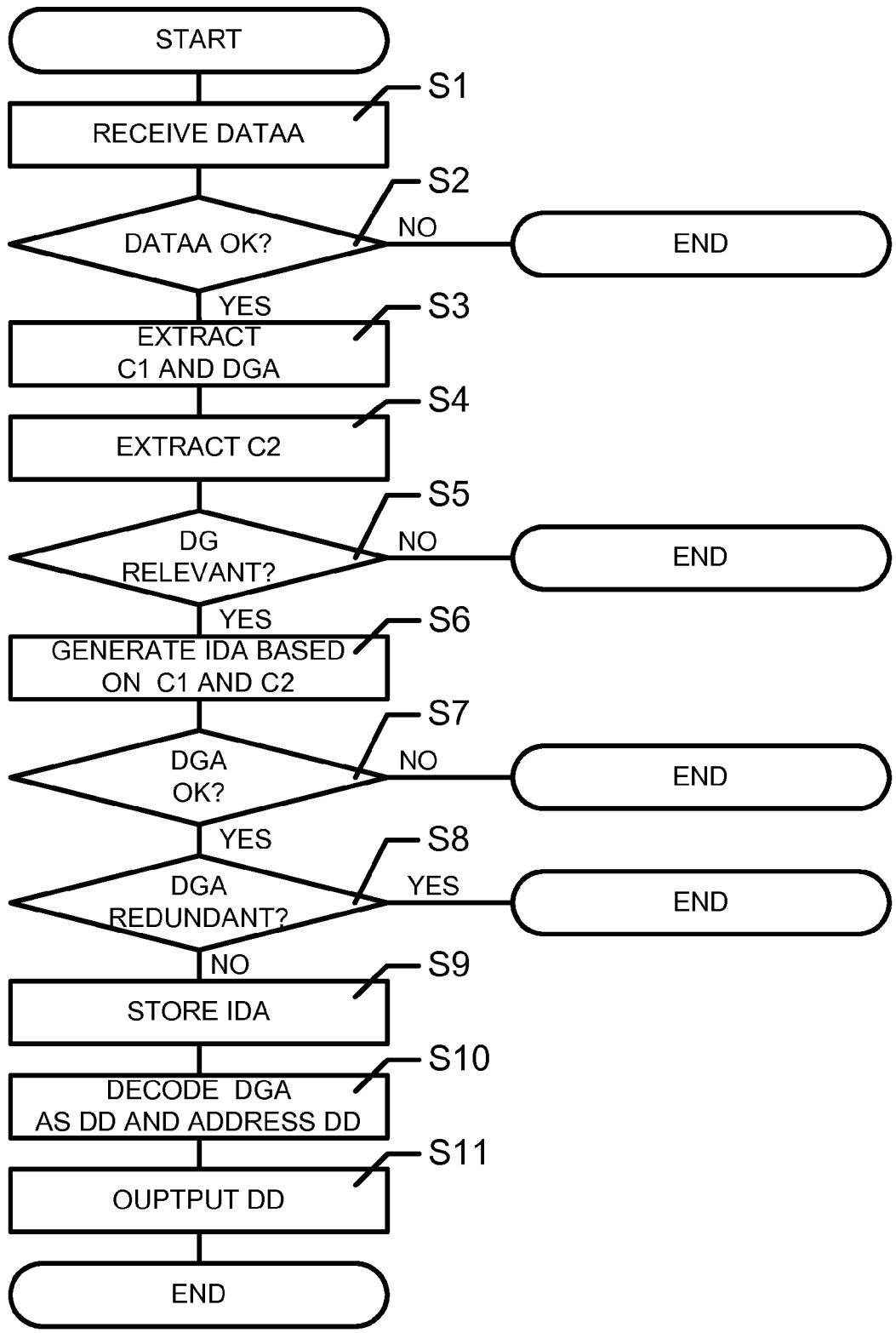
FIG. 2 is a flowchart of a preprocessing method.

FIG. 2 is a flowchart of a preprocessing method. In step S1, an Ethernet frame DATAA is received. In step S2, it is verified whether the Ethernet frame DATAA is corrupt or not. If the Ethernet frame DATAA is corrupt, further processing of the DATAA frame is not required, and the process ends. If the Ethernet frame DATAA is not corrupt, the IP destination address IP-D and the VLAN tag which are summarized as C1 data and form part of the packet information and the UDP datagram DGA are extracted from the Ethernet frame DATAA in step S3. A data area C2 comprising the destination port D-P, the sequence number SN, and the message number MN is extracted from the UDP datagram DGA in step S4. The destination port S-P also forms part of the packet information, whereas the sequence number SN and the message number MN form the application data information.

In step S5, it is verified whether the UDP datagram DGA is relevant on the basis of a comparison of the packet information with stored data. The UDP datagram is relevant if the stored data includes an entry that indicates that the UDP datagram is relevant. This entry is identical to the packet information or includes the packet information. If the UDP datagram DGA is not relevant, the further processing of the Ethernet frame DATAA is not required, and the process ends. If the UDP datagram DGA is relevant, identification data IDA is generated based on the C1 data and C2 data (based on the IP destination address IP-D, the VLAN tag, the destination port D-P, the sequence number SN, and the message number MN) in step S6. In step S7, it is verified whether the UDP datagram DGA is corrupt or not. If the UDP datagram DGA is corrupt, the further processing of the Ethernet frame DATAA is not required, and the process ends. If the UDP datagram DGA is not corrupt, it is verified whether the UDP datagram DGA is redundant in step S8 on the basis of a comparisons of the identification data IDA with stored data. The UDP datagram is redundant if the stored data includes an entry which is identical to the identification data IDA. If the UDP datagram DGA is redundant, the further processing of the Ethernet frame DATAA is not required, and the process ends.

If the UDP datagram DGA is not redundant, the identification data IDA is stored. The stored identification data IDA is used in order to verify the redundancy of later datagrams. In step S10, the UDP datagram is decoded as DD (converted in DD) and addressed to a storage area of a RAM (see FIG. 3). In step S11, the decoded UDP datagram DD is output. In general, the checks in step S2, S5, S7, or S8 require the receipt of all necessary data or a complete UDP datagram which usually takes several clock cycles. The UDP datagram is processed in a speculative stream mode, wherein a following step can start or even be finished before a previous step has ended, wherein the received data of a UDP datagram may be forwarded and further processed before all data of the UDP datagram has been received, and wherein the data resulting from a later step may be discarded if the result of a check started in an earlier step is negative. By starting a following step before the previous step is finished, the delay due to the preprocessing method is minimized. The steps S1 to S11 can also be performed in a different order.

The processing method can be executed by an entirely hardware embodiment, an entirely software embodiment or an embodiment containing both hardware and software elements. A software embodiment can include but is not limited to firmware, resident software, microcode, etc. Furthermore, the processing method can take the form of a computer program product accessible from a computer-usable or computer-readable medium providing program code for use by or in connection with a computer or any instruction execution system. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Hereinafter, the functioning of a preprocessing unit executing the preprocessing method is explained with reference to the steps in the flowchart FIG. 2.

FIG. 3 shows the architecture of a computer. The computer comprises several components including an input/output device 1, a CPU 2, a ROM 3, a RAM 4, a bus connection controller 5, a preprocessing unit (PPU) 6, a further processing unit 7, a main bus 8, an expansion bus 9, and two incoming lines 10 and 11. The input/output device 1 communicates with a keyboard, a mouse and a monitor via the connection 85. The input/output device 1, the CPU 2, the ROM 3, and the RAM 4 are directly connected to the main bus 8 and can send and/or receive data to/from other components of the computer. The preprocessing unit 6 and the further processing unit 7 are directly connected to the expansion bus and can send and/or receive data to/from other components of the computer. The bus connection controller 5 controls the data exchange between the main bus 8 and the expansion bus 9 and enables the data communication between the components 1, 2, 3, and 4 directly connected to the main bus 8 and the components 6 and 7 directly connected to the expansion bus 9. The expansion bus 9 is a PCI (Peripheral Component Interconnect) Express bus. Correspondingly, the bus connection controller 5 is a PCI Express controller, and the preprocessing unit 5 and the processing unit 7 which might be a graphics card are PCI Express cards. The functioning and interaction of the components 1, 2, 3, 4, 5, 7, 8, and 9 is known from the prior art and is therefore not described in detail.

The computer executes one or several software applications which use application data contained in input data. The application data is redundantly sent twice by a multicast delivery method by two different senders (one sender connected to the data line 10 and the other sender connected to the data line 11). The redundant data must not necessarily be sent by two different senders on two different lines. Redundant data may also be sent on a single line. By sending identical application data twice (once via each data line), the probability of data loss which is critical for any multicast delivery method is considerably reduced. The maximum delay between receipt of redundant application data is limited to a maximum delay. The incoming data lines 10 and 11 are Ethernet lines, and the input data is packed in Ethernet frames. The preprocessing unit 6, which is an inbuilt component of the computer, receives the Ethernet frames (step S1), performs the steps S2 to S10 with the Ethernet frames, and outputs the decoded application data DD on the line 12 (step S11), which is addressed to a storage area of the RAM 4. Then, the decoded application data DD is transferred via the extension bus 9, the connection controller 5, and the main bus 8 to the CPU 2 or to the RAM 4 where it is disposable (available) to the respective software application. By forwarding only relevant decoded data, the traffic on the buses 8, 9, and the data to be saved in the RAM and to be processed by the CPU 2 is reduced. The software application is adapted to the decoded application data DD of the preprocessing unit 6, so that the processing of the decoded application data DD requires less processing steps of the CPU 2 than corresponding undecoded data.

The preprocessing unit 6 executing the processing method can be an entirely hardware embodiment or an embodiment containing both hardware and software elements. As an embodiment containing both hardware and software elements, the preprocessing unit 6 can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. An entirely hardware embodiment of the preprocessing unit 6 is described hereinafter.

Figure 4:
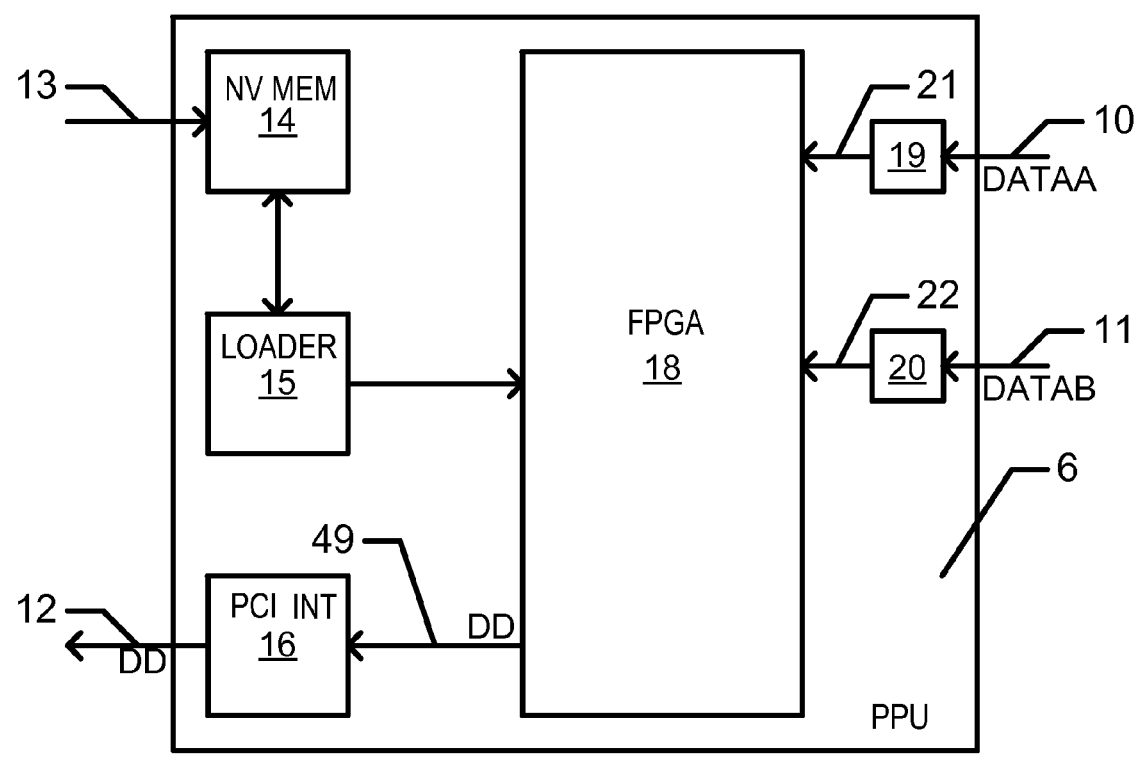
FIG. 4 shows the structure of the preprocessing unit of FIG. 3.

FIG. 4 shows the structure of the preprocessing unit 6 comprising a nonvolatile data memory 14, a data loader 15, a PCI interface 16, a FPGA circuit 18 and Ethernet interfaces 19, 20. Nonvolatile data memories, data loaders, PCI interfaces, and Ethernet interfaces are known from the state of the art. As far as the devices 14, 15, 16, 19, and 20 differ from known devices, a person skilled in the art could realize such devices from the description of the tasks performed by the devices. Therefore, the devices 14, 15, 16, 19, and 20 do not have to be explained in detail. The FPGA circuit 18 is described in detail with reference to FIG. 5 and FIG. 6. The FPGA (field programmable gate array) circuit 18 is an electronic circuit programmable by configurable electrical interconnections and can perform multiple logic functions in accordance with the configuration data in volatile local configuration memories and handling data in handling data memories of the FPGA circuit 18. The configuration memories present in any FPGA circuit are obvious to a person skilled in the art and are therefore not shown. In this context, configuration data are data which define the configuration of the electrical interconnections of the FPGA circuit 18, and handling data are data concerning the handling (processing) of the data received by the preprocessing unit 6. Before the FPGA circuit 18 can perform any desired logic functions, the corresponding configuration data have to be written in the volatile local configuration memories and the handling data have to be written in the handling data memories. For this purpose, the data loader 15 reads out the configuration data and handling data in the nonvolatile data memory 14 and transfers the configuration data to the volatile local configuration memories and the handling data to the handling data memories. The configuration data and application data in the nonvolatile data memory 14 can be exchanged by writing new data via the write-in line 13 in the nonvolatile data memory 14. In order to write new data in the nonvolatile data memory 14, the preprocessing unit 6 is removed from the computer and the line 13 is connected to a data loading device (not shown). Alternatively, the line 13 can be connected to the PCI bus 9 so that new data can be written in the nonvolatile data memory 14 without removing it. The preprocessing unit 6 receives Ethernet frames via the data lines 10 and 11 at the Ethernet interfaces 19 and 20 from two sender computers. The Ethernet interfaces 19 and 20 forward the Ethernet frames to the FPGA circuit 18 via the lines 21, 22. The FPGA circuit 18 receives the Ethernet frames (step S1), performs the steps S2 to S10 with the Ethernet frames and outputs the decoded application data DD via the line 49 to the PCI interface 16. The PCI interface 16 outputs the decoded application data DD via the line 12.

Figure 5:
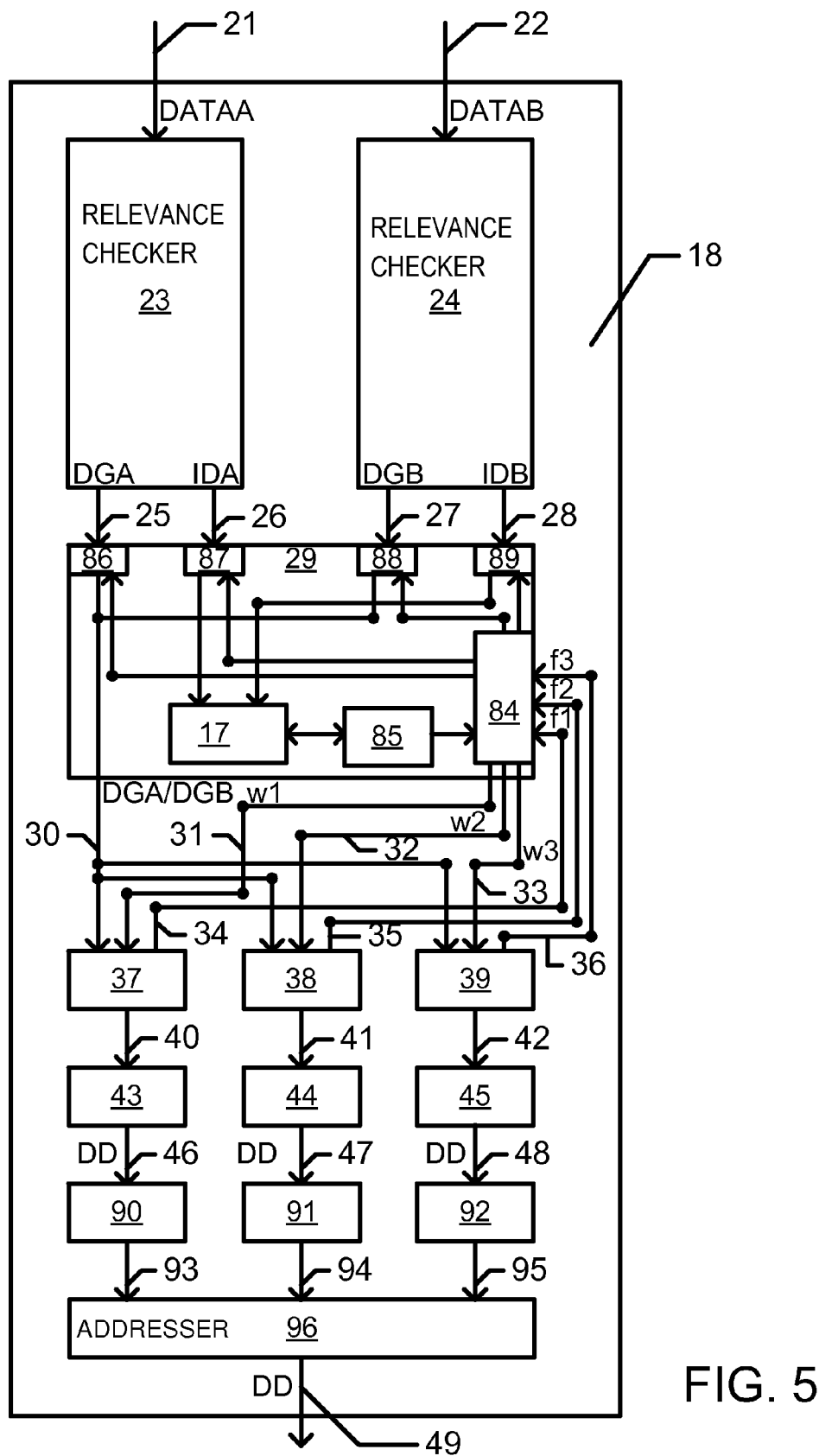
FIG. 5 shows the structure of a FPGA circuit included in the preprocessing unit.

FIG. 5 shows the structure of the FPGA circuit 18 included in the preprocessing unit 6. The FPGA circuit 18 comprises two relevance checkers 23 and 24, and a redundancy checker 29, six buffers 37, 38, 39, 90, 91, and 92, three decoders 43, 44, and 45, and an addresser 96. The redundancy checker 29 comprises a data comparator 85, an information memory 17, a controller 84, and buffers 86, 87, 88, and 89. Buffers, decoders, data comparators, information memories, controllers, and addressers are known from the state of the art. As far as the devices 37, 38, 39, 43, 44, 45, 85, 17, 84, 85, 86, 87, 88, 89, 90, 91, 92, and 96 differ from known devices, a person skilled in the art could realize such devices from the description of the tasks performed by the devices. Therefore, the devices 37, 38, 39, 43, 44, 45, 85, 17, 84, 85, 86, 87, 88, 89, 90, 91, 92, and 96 do not have to be explained in detail. The relevance checkers 23 and 24 are described in detail in FIG. 6.

In general, the relevance checkers 23, 24 are clocked with a lower frequency and have a lower data path width than the redundancy checker 29, the six buffers 37, 38, 39, 90, 91, and 92, three decoders 43, 44, and 45, and the assigner 96. Preferably, the relevance checkers 23, 24 are clocked with a frequency of 160 MHz and have a data path width of 64 bits, whereas the redundancy checker 29, the three buffers 37, 38, and 39 and three decoders 43, 44, and 45 are clocked with a frequency of 250 MHz and have a data path width of 128 bits. The relevance checker 23 receives an Ethernet frame DATAA via the line 21 (step S1), checks whether the Ethernet frame DATAA is corrupt (step S2), extracts the destination IP address IP-D and the VLAN tag summarized as C1 data, the data area C2 comprising the destination port D-P, the sequence number SN, and the message number MN, and the UDP datagram DGA of the Ethernet frame DATAA (step S3+S4), decides whether the Ethernet frame DATAA is relevant for the software application(s) running on the computer by means of the packet information (comprising the destination IP address IP-D, the VLAN tag, and the destination port address D-P) of the Ethernet frame DATAA or not (step S5), generates the identification data IDA (step S6), and checks whether the UDP datagram DGA is corrupt or not (step S7). If the Ethernet frame DATAA is relevant for the software application(s) and not corrupt, and the UDP datagram DGA is not corrupt, the relevance checker 23 generates and outputs identification data IDA on the line 26 and the UDP datagram DGA of the Ethernet frame DATAA on the line 25.

The identification data comprises an identifier based on the destination IP address IP-D, the VLAN tag, the destination port address D-P, the sequence number SN, and the number of messages N, an indication of the decoder(s) 43, 44, and 45 to be used in order to decode the UDP datagram DGA and a relative time stamp indicating when the identification data was created in order to assess the performance of the FPGA circuit 18. The identifier is identical for Ethernet frames comprising identical application data. The UDP datagrams have a format which can be identified by the respective packet information and application data information. The decoders 43, 44, and 45 may decode data from a specific format, e.g., ASCII format, into data in another specific format, e.g., binary format, which can be easily processed. In addition, the decoders 43, 44, and 45 may only decode certain parts of the payload, e.g., the message data M1, M2, M3, . . . Mi. The indication indicating which decoder(s) 43, 44, and 45 is (are) suitable for decoding UDP datagrams DGA is based on the packet information and application data information. If the Ethernet frame DATAA is corrupt or contains no relevant application data, or the UDP datagram DGA is corrupt, the relevance checker 23 discards the Ethernet frame DATAA (does not output any signal, a signal depending on the packet information or application data information or a signal containing decoded or undecoded packet information or application data information on line 26 and/or any signal, a signal depending on the application data or a signal containing decoded or undecoded application data on line 25).

Analogously, the relevance checker 24 which is constructed identically to the relevance checker 23 receives an Ethernet frame DATAB via the line 22, processes the Ethernet frame DATAB, generates and outputs the respective identification data IDB on the line 28 and the UDP datagram DGB of the Ethernet frame DATAB on the line 27 or discards the Ethernet frame DATAB. The redundancy checker 29 receives the identification data IDA and the corresponding UDP datagram DGA via the lines 26 and 25, respectively, and buffers the identification data IDA in the buffer 87 and the UDP datagram DGB in the buffer 86. Analogously, the redundancy checker 29 receives the identification data IDB and the corresponding UDP datagram DGB via the lines 28 and 27, respectively, and buffers the identification data IDB in the buffer 89 and the UDP datagram DGB in the buffer 88. The buffering allows the redundancy checker 29 to finish the processing of the data received before. The information memory 17 of the redundancy checker 29 contains entries of identification data received before. Each of the buffers 37, 38, and 39 is associated with one of the decoders 43, 44, and 45 (i.e., the data stored in the buffers 37, 38, and 39 is sent to only one of the decoders 43, 44, and 45), respectively. The buffers 37, 38, and 39 continuously send fill level signal f1, f2, and f3 indicating the fill level of the respective buffer 37, 38, and 39 to the controller 84. The controller 84 sends control signals to the buffers 86 and 87 in order to enable the buffers 86 and 87 to output the UDP datagram DGA and identification data IDA, respectively. The data comparator 85 receives the identification data IDA and compares the identification data IDA with the entries in the information memory 17 (step S8). If the information memory 17 contains no identical entry, the data comparator 85 sends a signal indicating that the information memory 17 contains no identical entry to the controller 84 and stores the identification data IDA in the information memory 17 (step S9). If the (oldest) identification data entry in the information memory 17 is older than the maximum possible delay between identical identification data IDA, the redundancy checker 29 deletes the first (oldest) identification data entry in the information memory 17. The controller 84 receives the signal indicating that no identical application data has been received before and the fill level signals f1, f2, and f3 indicating the fill level of the respective buffers 37, 38, and 39 and sends a write signal w1, w2, or w3 via the write signal lines 31, 32 or 33 to one of the buffers 37, 38, or 39 associated with a suitable decoder 43, 44, or 45. If there are several decoders 43, 44, 45 suitable for the decoding of the UDP datagram DGA, a write signal w1, w2, w3 is sent to the buffer 37, 38, or 39 associated with a suitable decoder 43, 44, or 45 and having the lowest fill level. The redundancy checker 29 outputs the UDP datagram DGA on the line 30 which is connected to the inputs of all buffers 37, 38, and 39.

The buffer 37, 38, or 39 receiving the write signal w1, w2, w3 is enabled to read the UDP datagram DGA. If the information memory 17 contains a packet information entry indicating that identical application data has been received before, the data comparator 85 sends a signal indicating that identical application data has been received before to the controller 84 and the controller generates no write signal w1, w2, or w3, so that none of the buffers 37, 38, or 39 is enabled to receive the UDP datagram DGA. Then, the controller 84 switches to the data received from the other relevance checker 24 by sending control signals to the buffers 88 and 89 in order to enable the buffers 88 and 89 to output the UDP datagram DGB and identification data IDB, respectively. The relevance checker 24 processes the UDP datagram DGB and identification data IDB analogous to the UDP datagram DGA and identification data IDA. In temporal terms, the switching is possible as the data path width of the redundancy checker 29 is twice as high as the data path widths of the relevance checkers 23, 24 and the frequency of the redundancy checker 29 is considerably higher than the frequencies of the relevance checkers 23, 24. The decoders 43, 44, and 45 detect whether a UDP datagram DGA is stored in the respective buffer 37, 38 or 39 and read out the UDP datagram DGA. The respective decoder 43, 44 or 45 decodes the UDP datagram DGA (step 10) and outputs the decoded UDP datagram DD via the line 46, 47, or 48 to the respective buffer 90, 91, or 92. The addresser 96 reads out the data stored in the buffers 90, 91, or 92 consecutively and continuously using a round robin procedure, wherein the data stored in the buffers 90, 91, and 92 is read out only if the data has a minimum size of several bytes or the complete decoded UDP datagram is stored in the respective buffer 90, 91, or 92. Alternatively, the buffers 90, 91, or 92 can generate fill level signals and send the fill level signals to the addresser 96, and the addresser 96 can read out the data stored in the buffer 90, 91, or 92 with the highest fill level. The addresser 96 addresses the data read out from the buffers 90, 91, or 92 (the decoded UDP datagrams DD) to a specified storage area of the RAM 4 (see FIG. 3) and outputs the data (the decoded UDP datagrams DD) on the line 49 (step S11).

Figure 6:
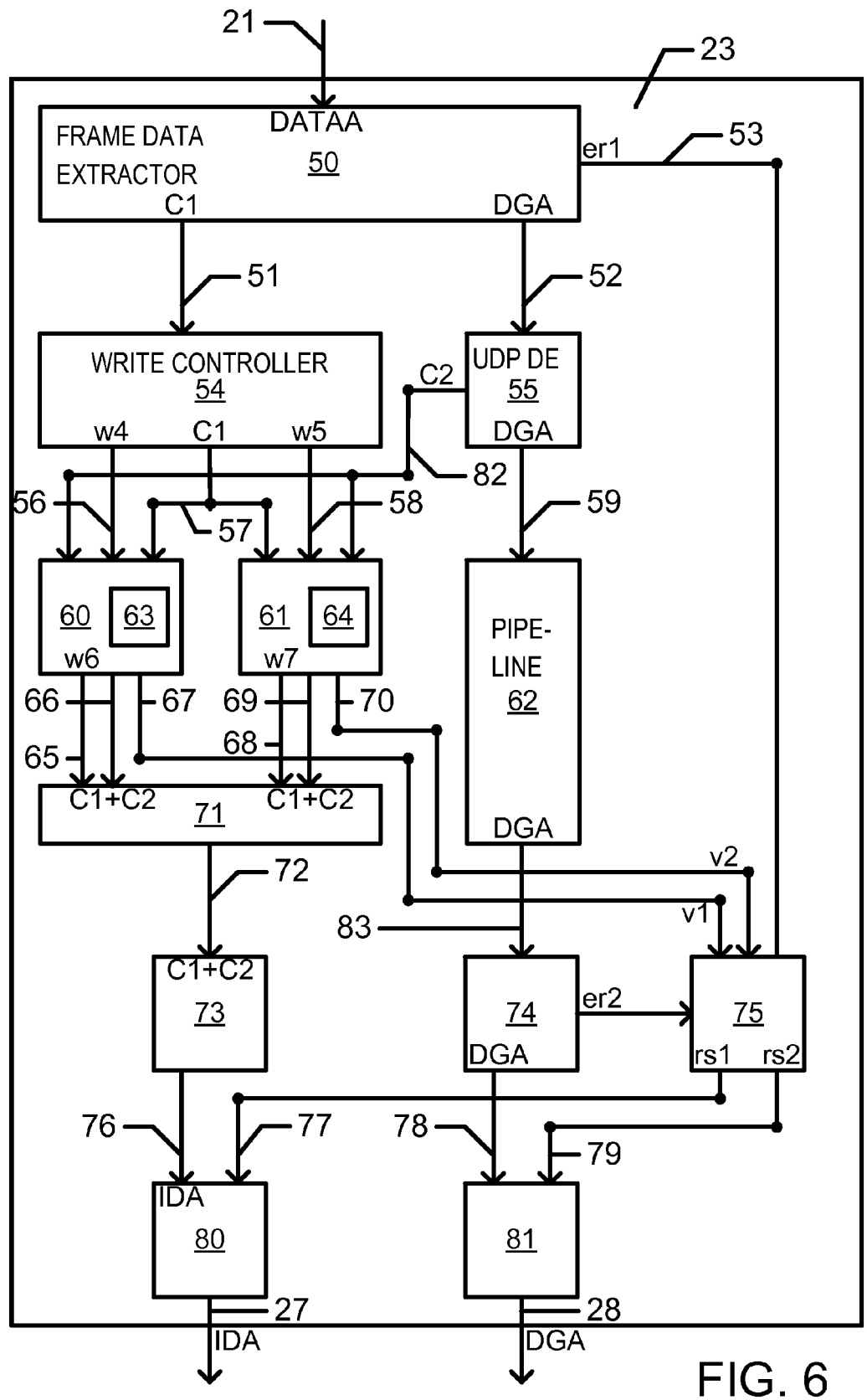
FIG. 6 shows the structure of a relevance checker which is a component of the FPGA circuit.

FIG. 6 shows the structure of the relevance checker 23, which is a component of the FPGA circuit 18. The relevance checker 23 comprises a frame data extractor 50, a write controller 54, a UDP datagram data extractor 55, two subscription checker 60, 61 each including a subscription memory 63 and 64, respectively, a delayer (pipeline) 62, a multiplexer 71, a decoder 73, a datagram checker 74, a controller 75, and two buffers 80, 81. Frame data extractors, write controllers, datagram data extractors, subscription checkers, subscription memories, delayers (pipelines), multiplexers, decoders, datagram checkers, controllers, and buffers are known from the state of the art. As far as the devices 23, 50, 54, 55, 60, 61, 63, 64, 62, 71, 73, 74, 75, 80, and 81 differ from known devices, a person skilled in the art could realize such devices from the description of the tasks performed by the devices.

The frame data extractor 50 receives the Ethernet frame DATAA from the incoming line 21 (step S1), checks whether the Ethernet frame DATAA is corrupt or not using the data in the CRC field (step S2), extracts the packet information comprising the destination IP address IP-D and the VLAN tag summarized as C1 data and the UDP datagram DGA (step S3), and sends the C1 data via the line 51 to the write controller 54 and the UDP datagram via the output line 52 to the datagram data extractor 55. If the Ethernet frame DATAA is corrupt, the Ethernet frame extractor sends an error signal er1 via the line 53 to the controller 75. As the check requires the receipt of all bits of the Ethernet frame DATAA, the check might be finished after some of the following steps. The write controller 54 receives the C1 data from the output line 51 and outputs the C1 data on the line 57 and a single write signal w4 or w5 via the respective line 56 or 57 to the respective subscription checker 60 or 61. The datagram data extractor 55 receives the UDP datagram data DGA, extracts a data area C2 of the UDP datagram DGA containing the destination port D-P, the sequence number SN, and the message number MN and having a length of several bytes, and the UDP datagram DGA. The position and the format of the sequence number SN and the message number MN depend on the VLAN tag, IP-D and D-P. The datagram data extractor 55 sends the C2 data containing the destination port D-P, the sequence number SN, and the message number MN via the output line 82 to both subscription checkers 60, 61 and transfers the UDP datagram DGA via the line 59 to the delayer 62. However, only the subscription checker 60 or 61 receiving the write signal w4 or w5 is enabled to receive the C1 data and the C2 data. To ensure that both subscription checkers are equally loaded and not overloaded, the write signal w4 is sent out if the last write signal sent out by the write controller 54 is the write signal w5 and vice-versa. By a binary search for subscription data in the subscription memory (lookup table) 63 and 64, respectively, the subscription checker 60 or 61 receiving the write signal w4 or w5 checks whether the respective DGA is relevant or not (step 5). The subscription memories 63 and 64 are the handling data memories mentioned before. Correspondingly, the subscription data are handling data mentioned before. The subscription checker 60 or 61 searches for an entry which is identical to the packet information or includes the packet information. This search usually takes longer than the receipt of the complete Ethernet frame DATAA, but not twice as long as the receipt of the complete Ethernet frame DATAA. Therefore, a single subscription checker could be overloaded. By using two subscription checkers 60 and 61 in parallel, an overload can be prevented. In addition, the subscription checkers 60 and 61 check continuously whether the subscription data in the subscription memory 63 and 64, respectively, is corrupt or not using check data, e.g., one or several parity bits, stored in the respective subscription memory 63 and 64, respectively (the check data are also handling data).

If the UDP datagram DGA is not relevant or subscription data is not correct, the subscription checkers 60 and 61 send a control signal v1 and v2, respectively, indicating that UDP datagram DGA is not relevant or subscription data is not correct to the controller 75. If the UDP datagram DGA is relevant and the subscription data is correct, the subscription checkers 60 and 61 send a control signal v1 and v2, respectively, indicating that UDP datagram DGA is relevant and subscription data is correct to the controller 75. Additionally, the subscription checker 60 sends the C1 data and C2 data via the line 66 and a write signal w6 via the line 65, and the subscription checker 61 sends the C1 data and C2 data via the line 69 and a write signal w7 via the line 68 to the multiplexer 71. The write signals w6 and w7 enable the multiplexer 71 to receive the C1 data and C2 data from subscription checkers 60 and 61, respectively. The multiplexer 71 receives the C1 data and C2 data and outputs the C1 data and C2 data via the line 72 to the decoder 73. The decoder 73 decodes the C1 and C2 data (the decoded C1 data and C2 data is referred to as identification data IDA, step S6), and outputs the identification data IDA via a line 76 to the buffer 80. The delayer 62 delays the UDP datagram DGA by several clock cycles and outputs the UDP datagram DGA via the line 83 to the datagram checker 74. The datagram checker 74 checks whether the UDP datagram DGA is corrupt or not using the data in the CS field and/or the L field of the UDP datagram header UDP-H and/or the length of the UDP datagram DGA and outputs the UDP datagram DGA via the line 78 to the buffer 81 (step S7).

If the UDP datagram DGA is corrupt, the datagram checker 74 sends an error signal er2 to the controller 75. If the controller 75 receives an error signal er1 from the frame extractor 50 indicating that the Ethernet frame DATAA is corrupt, an error signal from the datagram checker 74 indicating that the UDP datagram DGA is corrupt, or a control signal v1 or v2 from the subscription checker 60 and 61, respectively, indicating that the subscription data is corrupt or that the UDP datagram DGA is not relevant, the controller 75 sends a reset signal rs1 w8 via the line 77 to the buffer 80 and a reset signal rs2 via the line 79 to the buffer 81. The buffer 80 receives the identification data IDA from the decoder 73. If the buffer 80 receives no reset signal rs1, it outputs the identification data IDA on the line 27. If the buffer 80 receives a reset signal rs1, the buffer 80 is reset, the identification data IDA is discarded, and the buffer 80 does not output the identification data IDA. The buffer 81 receives the UDP datagram DGA from the datagram checker 74. If the buffer 81 receives no reset signal rs2, it outputs the UDP datagram DGA on the line 28. If the buffer 81 receives a reset signal rs2, the buffer 81 is reset, the UDP datagram DGA is discarded, and the buffer 80 does not output the UDP datagram DGA.

What is claimed is:

1. A method of data processing, the method comprising:
a preprocessing unit receiving a data packet containing packet information and application data;
the preprocessing unit determining relevance of said data packet in dependence on said packet information;
the preprocessing unit controlling output of preprocessor output data in dependence on the relevance of said data packet;
the preprocessing unit determining redundancy of said application data based on identification data of the data packet, wherein the identification data of the data packet includes a destination address, virtual network tag, destination port, sequence number and message number of the data packet; and
the preprocessing unit controlling output of preprocessor output data in dependence on the redundancy of said application data.

2. The method of claim 1, and further comprising:
decoding said application data to obtain decoded application data.

3. The method of claim 2, and further comprising:
addressing said decoded application data to a storage area of a memory.

4. The method of claim 1, wherein:
said preprocessing unit includes at least one buffer adapted to output a fill level signal; and
the method further comprises the preprocessing unit controlling receipt of said application data by said at least one buffer in dependence on said fill level signal.

5. The method of claim 1, wherein:
determining relevance comprises determining relevance of said data packet received from a first incoming line in dependence on said packet information; and
the method further comprises:
the preprocessing unit determining relevance of a further data packet received from a second incoming line in dependence on the packet information of said further data packet.

6. The method of claim 1, wherein the method further comprises:
the preprocessing unit determining whether the data packet originates from a subscribed sender; and
the preprocessing unit delaying transfer of the application data while relevance of the data packet is determined.

7. The method of claim 1, wherein:
the method further comprises:
the preprocessing unit storing identification data of data packets in an information memory and determining redundancy of said application data in dependence on the identification data of data packets stored in said information memory.

8. The method of claim 7, wherein said identification data also depends on said packet information.

* * * * *